(12) United States Patent
Niakan et al.

(10) Patent No.: US 10,648,404 B2
(45) Date of Patent: May 12, 2020

(54) VENT INSERT

(71) Applicant: Advanced Flow Engineering, Inc., Irvine, CA (US)

(72) Inventors: Shahriar Nick Niakan, Anaheim Hills, CA (US); Saul Daniel Zambrano, Corona, CA (US)

(73) Assignee: Advanced Flow Engineering, Inc., Irvine, CA (US)

( * ) Notice: Subject to any disclaimer, the term of this patent is extended or adjusted under 35 U.S.C. 154(b) by 4 days.

(21) Appl. No.: 15/530,911

(22) Filed: Mar. 20, 2017

(65) Prior Publication Data

US 2018/0266309 A1 Sep. 20, 2018

(51) Int. Cl.
| | |
|---|---|
| *F02B 37/16* | (2006.01) |
| *F02B 37/18* | (2006.01) |
| *F02M 25/06* | (2016.01) |
| *F01M 13/00* | (2006.01) |
| *F02D 41/00* | (2006.01) |
| *F02D 41/14* | (2006.01) |

(52) U.S. Cl.
CPC ........... *F02B 37/162* (2019.05); *F01M 13/00* (2013.01); *F02B 37/18* (2013.01); *F02M 25/06* (2013.01); *F02D 41/0007* (2013.01); *F02D 41/1448* (2013.01); *Y02T 10/144* (2013.01)

(58) Field of Classification Search
CPC .. F01M 13/00; F01M 13/04; F01M 2013/027; F01M 13/02; F02B 37/127; F16L 21/002; F16L 37/098; F16L 37/096; F16L 23/00
See application file for complete search history.

(56) References Cited

U.S. PATENT DOCUMENTS

| | | | | |
|---|---|---|---|---|
| 4,790,287 | A | * 12/1988 | Sakurai | .................. F01M 13/04 123/41.86 |
| 5,022,376 | A | * 6/1991 | Hudson, Jr. | ............ F01M 13/04 123/41.86 |
| 2017/0002777 | A1* | 1/2017 | Chen | ................ F02M 35/10262 |

FOREIGN PATENT DOCUMENTS

| | | | | |
|---|---|---|---|---|
| DE | 10320857 A1 | * 11/2004 | ........... | F01M 13/022 |
| DE | 102010019931 A | * 11/2011 | ........... | F01M 13/022 |
| WO | WO 2006135327 A1 | * 12/2006 | ........... | F01M 13/022 |
| WO | WO 2009084144 A1 | * 7/2009 | ............. | F02M 25/06 |

* cited by examiner

*Primary Examiner* — Ngoc T Nguyen
(74) *Attorney, Agent, or Firm* — Ravi Mohan; Rutan & Tucker, LLP

(57) ABSTRACT

A vent insert is disclosed for use with an automotive turbocharger system. The vent has a substantially cylindrical hollow tube with a first end for seating the vent and a second open end. The first end has a rim around an opening. The second end of the vent has an angled opening that faces away from the direction of the gas flow when the vent insert is operating within the turbocharger system. There are a plurality of protrusions extending outward from the outside surface of the vent to assist in keeping the vent insert in place in the turbocharger system.

3 Claims, 6 Drawing Sheets

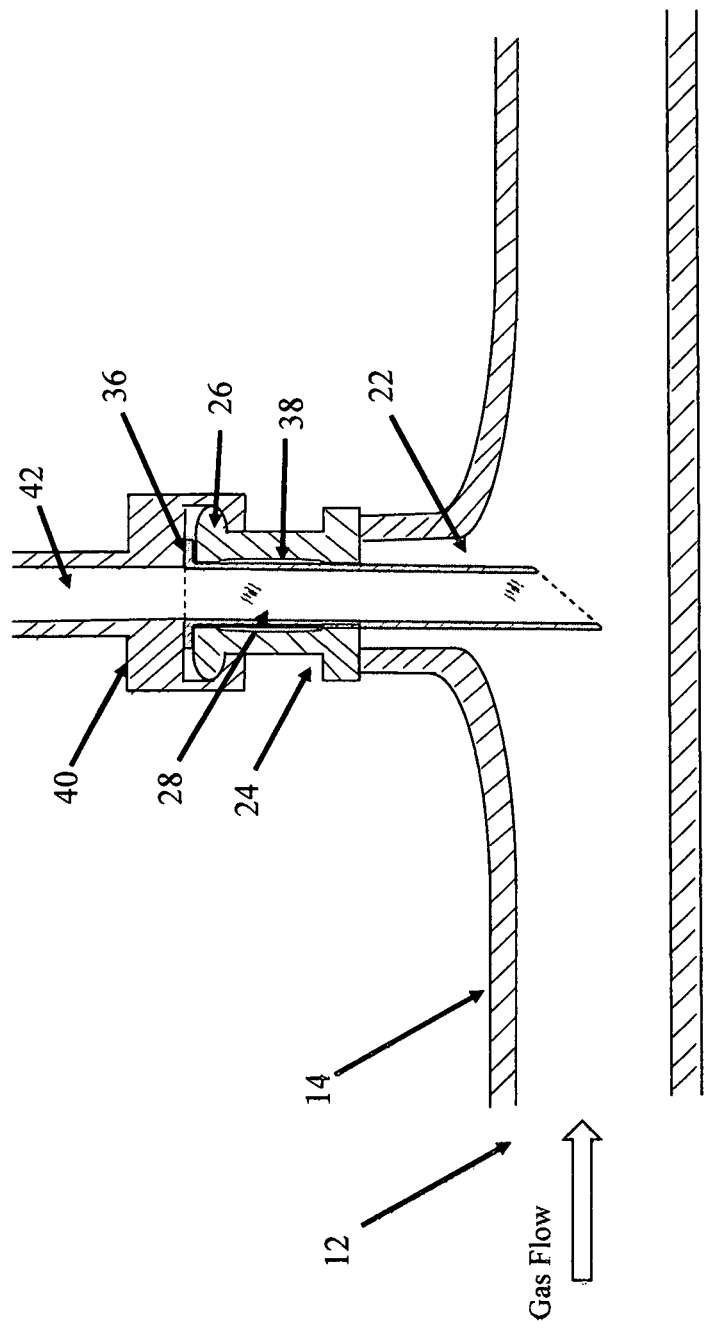

VENT INSERT

BACKGROUND OF THE INVENTION

Field of the Invention

This invention generally relates to addressing the reduction or loss of a vacuum signal in an internal combustion engine air system. In one embodiment, the systems can be applied to automotive crankcase ventilation systems and turbochargers.

Background Art

During the operation of an internal combustion engine, an air intake system directs air to the engine where the air is combine with fuel. The air and fuel mixture is directed to a combustion chamber where the mixture is ignited causing an expansion of gas that forces a piston. The ignited gas, or exhaust gas, is then removed from the chamber.

The exhaust gas can be used to improve engine operation by directing the exhaust gas to a turbocharger. A turbocharger provides more air to the combustion chamber. The turbocharger has a compressor wheel and a turbine wheel connected by a shaft. The exhaust from the engine drives the turbine wheel, which in turn through the shaft drives the compressor wheel. The exhaust gas is then directed to an exhaust outlet. The moving compressor wheel draws in air and compresses it. The compressed air is usually sent to an intercooler and then the engine to combine with the fuel. The air and fuel mixture is sent to the combustion chamber, where the process repeats.

The turbocharger can increase engine efficiency and improve engine performance by regulating the amount of air available for the air and fuel mixture. This requires regulating the pressure of the exhaust gas and therefore the speed of the turbine wheel. Such regulation uses a waste-gate to divert exhaust gas before reaching the turbine to control the speed of the turbine and as a result the speed of the compressor turbine and pressure of the compressed air. The waste-gate can include a valve and sensor where the sensor detects the pressure of the exhaust air and at a certain value the waste-gate is either in an operative or inoperative state. Thus, the compressed air is regulated.

It can be important to monitor exhaust gas and crankcase venting fluctuations with some precision and have the system respond quickly to changes in exhaust gas or crankcase pressure. What is needed is a way to improve the detection of changes in the exhaust gas and/or crankcase venting pressure.

SUMMARY OF THE INVENTION

In one embodiment of the present invention, a vent is comprised of a substantially cylindrical hollow tube having a first end for seating the vent and a second open end. The seating end has rim around an opening such that the rim can contact a connecting element thereby preventing the vent insert from entering further into the connecting element. The second end of the vent has an angled opening such that the substantially cylindrical hollow tube faces the direction of the gas flow and the angled opening faces away from the direction of the gas flow. There are a plurality of protrusions on the outside surface of the vent extending generally from the rim toward the second end of the vent such that when the tube is inserted into the connecting element the tube remains substantially in the position that is inserted.

BRIEF DESCRIPTION OF THE DRAWINGS

The invention is generally shown by way of reference to the accompanying drawings in which:

FIG. 6 is a cross sectional view of a vent insert inside a connection element that is attached to a tube and a mating element.

DETAILED DESCRIPTION OF THE INVENTION

Figure 1:
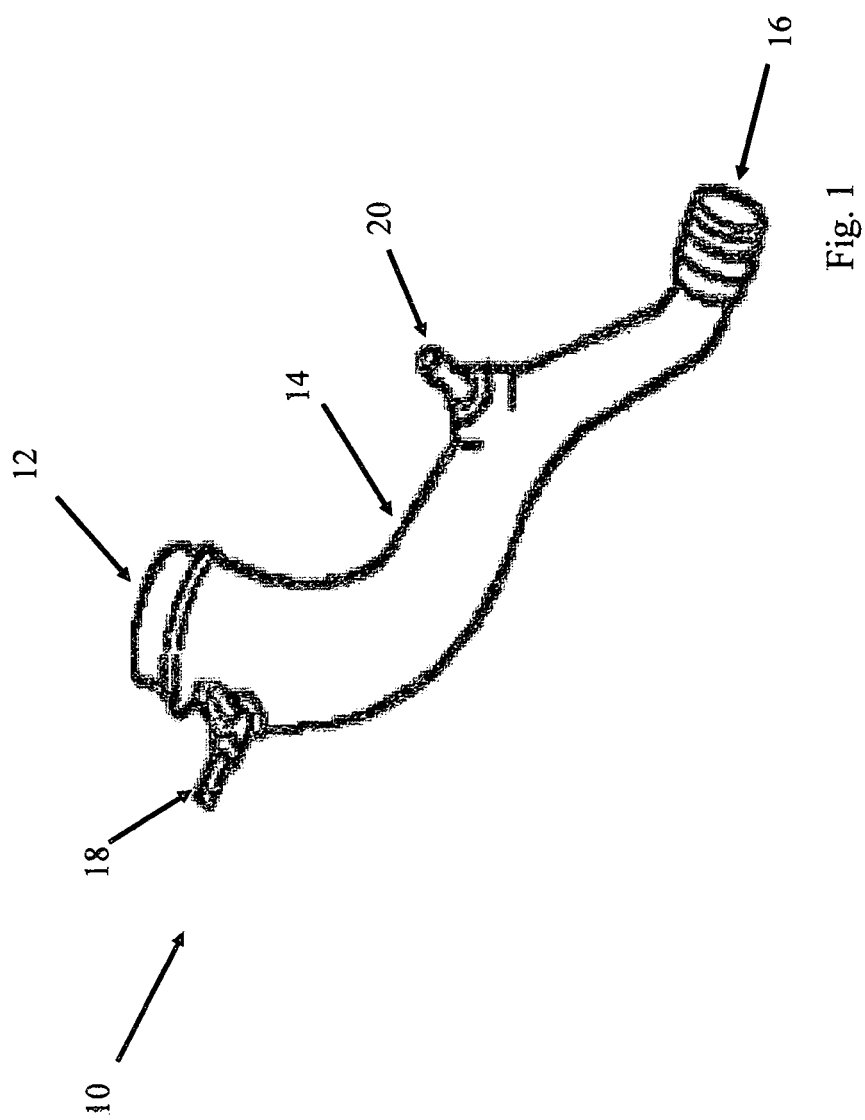
FIG. 1 is a perspective view of a driver's side turbo inlet tube.

FIG. 1 shows an embodiment of a left side turbo inlet tube 10. Gas flows from the inlet opening 12 through the gas inlet tube 14 and to the outlet 16. Also present in the embodiment of FIG. 1 is a valve cover connection 18 and a sensor inlet 20.

During operation, the gas flows from the opening 12 through the tube 14 and exits from the outlet 16. As the gas flows in the gas inlet tube 14, a pressure differential exists between the inside of the tube and the sensor inlet 20 and crankcase ventilation connection 18. There are sensors attached to the crankcase ventilation connection and the sensor inlet 20 that detect the pressure differential. The information off the crankcase ventilation pressure is sent to a mechanism (mechanical, electrical, electro-mechanical as examples) that adjusts the operation of the turbocharger.

Figure 2:
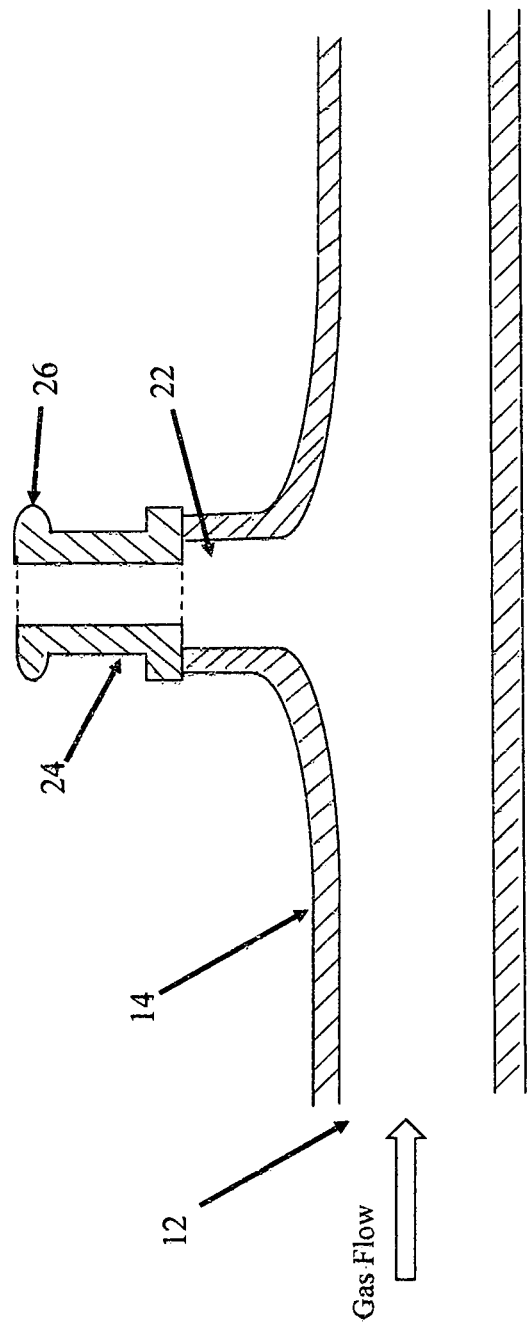
FIG. 2 is a is a cross sectional view of an embodiment of a portion of a hollow tube as part of a turbo inlet.

FIG. 2 is a cross sectional view of an embodiment of a portion of a hollow gas inlet tube 14 as part of a turbo inlet. The direction of the flowing gas during operation is indicated in the figure. There is an opening 22 in the gas inlet tube 14. In this embodiment, there is a connection element 24 that attaches to the tube over the opening 22. Part of the connection element 24 includes a connecting rim 26. In this embodiment a vent tube can attach to the rim 26. The opposite end of the vent tube then connects to a sensor that detects changes in pressure. The information collected from the sensor about the crankcase ventilation pressure is then used by the engine control unit to control engine operation.

Figure 3:
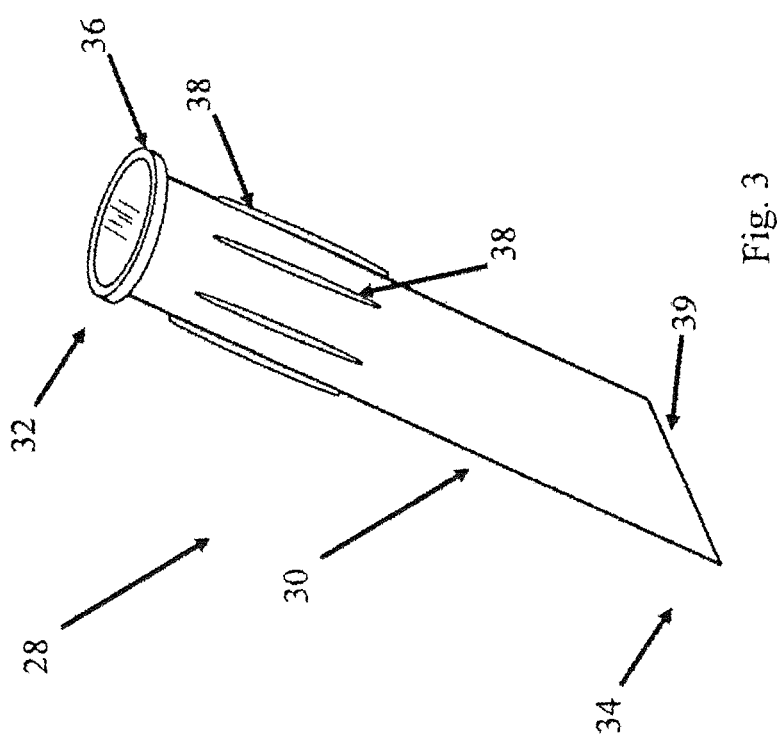
FIG. 3 is a perspective view of an embodiment of a vent insert.

FIG. 3 is a perspective view of one embodiment of the vent insert 28. In this embodiment, there is a substantially cylindrical hollow body 30 that has a first open end 32 and a second open end 34. In the present embodiment, the first end 32 has a rim 36 to seat the vent insert 28 in the connection element 24 of the left side turbo inlet tube 10. In this embodiment, the rim 36 is around the first opening while in other embodiments the rim 36 may not completely encircle the first opening. The second end 34 has an angled surface 39 that forms an angled opening for the hollow cylindrical body 30. The angle can be chosen based upon factors such as, but not limited to, the velocity of the gas flow, the density of the gas, and the sensitivity of a sensor used to detect the change in pressure in the tube. The shape of the angled surface can be of any number of geometries.

In the present embodiment, the angle of the surface is approximately 45 degrees in relation to the surface of the cylindrical body.

In the embodiment of FIG. 3, there are a plurality of protrusions 38 that are on the surface of the cylindrical tube 30 and the protrusions 38 extend along the length of the cylindrical body 30. In other embodiments the protrusions can be located on the rim 36 in the area that would come into contact with the connection element 24. In other embodiments the protrusions could come into contact with structures that attach to the connection element 24 so that the vent insert 28 would remain substantially in place.

When the vent insert 28 is inserted into the connection element 24, the protrusions 38 substantially keep the vent insert 28 in place and the protrusions 38 assist in preventing the vent insert 28 from rotating during operation. This allows the angled opening to remain facing the general direction opposite of the gas flow. The rim 36 being in contact with the connection element 24 assists in preventing the vent insert 28 from going too deep into the gas inlet tube 14.

Figure 4:
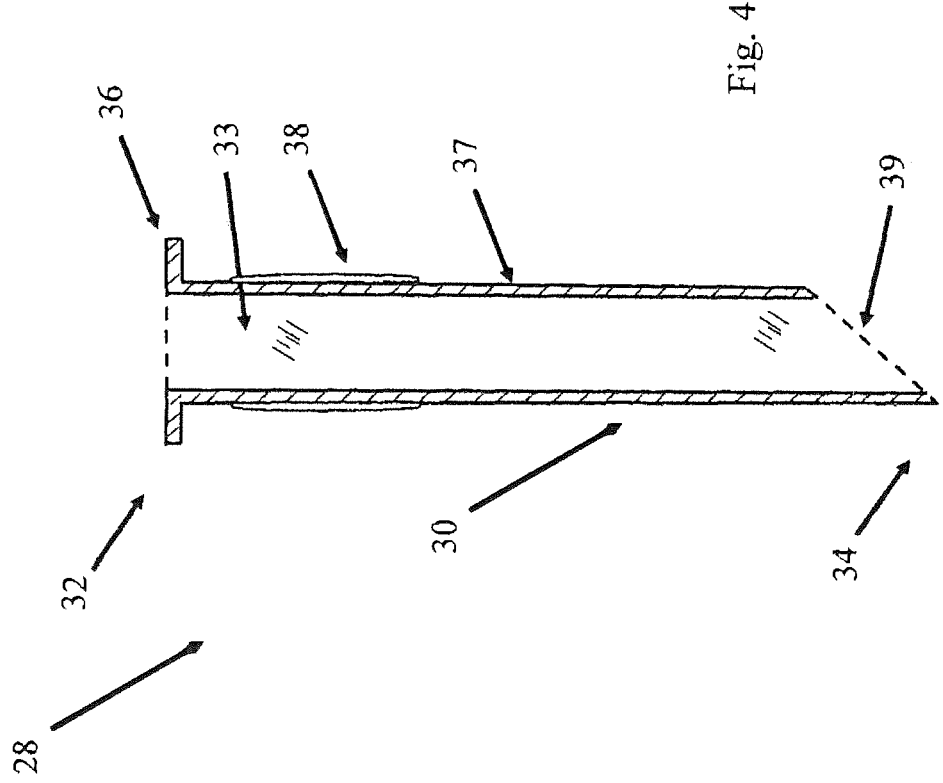
FIG. 4 is a cross sectional view of an embodiment of a vent insert.

Turning to FIG. 4, a cutaway side view of the vent insert 28 is presented. Also present is the inside surface 33 of the vent insert and the outside surface 37 of the vent insert 28.

Figure 5:
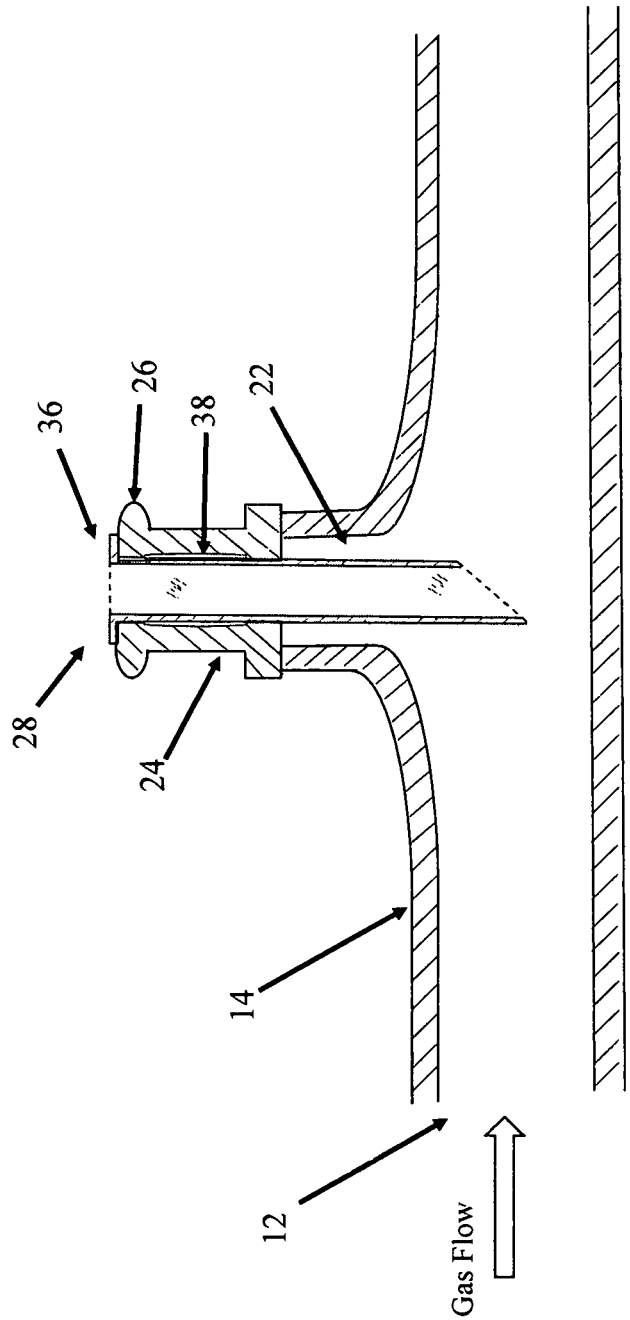
FIG. 5 is a cross sectional view of a vent insert inside a connection element that is attached to a tube.

FIG. 5 illustrates an embodiment of the invention with the vent insert 28 placed within the connection element 24. The rim of the vent insert comes into contact with the connection element and the protrusions of the vent insert come into contact with the inside surface of the connection element. The rim 36 is thin enough not to substantially interfere with any structures that attaches to the connection element 24 and also prevents vent insert 28 from entering too far into the tube 14.

As the gas flows through the gas inlet tube 14, the moving gas comes into contact with the generally convex outer surface of the vent insert resulting in an area of low pressure. As the gas goes around the convex surface, the angled opening of the vent insert experiences a difference in pressure. This difference in pressure also occurs within the cylindrical body of the vent insert and is detected by a sensor. The system then can adjust the operation of the turbocharger based upon the flow of the gas in the system.

Pressure in the proximity of the vent can be described by known processes. The tendency of a stream of fluid to stay attached to a convex surface, rather than follow a straight line in its original direction, and result in a low pressure area is known as the Coandă effect. Furthermore, as the speed of the gas changes as a result of the operation of the turbocharger, the pressure flowing through the gas inlet tube 14 also changes. The change in pressure based upon speed can be determined by Bernoulli's principle. The vent insert allows for a mechanism to detect the pressure changes.

Turning to FIG. 6, the vent insert 28 is placed between the connection element 24 and a mating element 40. In this embodiment, the mating element 40 is substantially secured in place in relation to the connection element 24 by known means including vent fitting tabs. As indicated in FIG. 6, the rim 36 fits between the connection element 24 and the mating element 40. The rim 36 is thin enough so that the presence of the rim 36 between the connection element 24 and the mating element 40 would not substantially interfere with the relative integrity of the seal between the connection element 25 and the mating element 40.

Mating element 40 has a passage 42 that cooperates with the internal volume of the vent insert 28. As the gas flows through the tube 14, the gas makes contact with the second end 34 of the vent insert 28, which has an angled surface 39 that forms an angled opening for the hollow cylindrical body 30. The moving gas contacts the angled surface 39 and a low pressure region results. The change in pressure then occurs in the hollow body of the vent insert 28 and further in the passage 42 of the mating element 40. In one embodiment the mating element is connected to a pressure sensor that registers the change in pressure. The pressure sensor then communicates the information regarding the change in pressure to the electronic control unit that controls a turbocharger. The vent insert can increase the sensitivity of a change in pressure of the gas flow. In that regard the vent insert amplifies the change in pressure.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A vent insert for use with the air inlet system of a turbocharger of an internal combustion engine, the vent insert comprising:
    a cylindrically shaped hollow tube having a first end, a second end, an inner surface and an outer surface;
    the first end of the cylindrically shaped hollow tube having an opening and a rim extending outwardly from the outer surface of the cylindrical shaped hollow tube in the locality of the first end opening and surrounding the opening of the first end;
    the second end of the cylindrically shaped hollow tube having an angled cut forming an angled opening;
    the cylindrically shaped hollow tube adapted to cooperate with a gas inlet tube of a turbocharger system such that the rim restricts access into the gas inlet tube; and
    the outer surface of the cylindrically shaped hollow tube having a plurality of non-contiguous surface protrusions disposed circumferentially and extending along the length of the cylindrical body from approximately the first end toward the second end and adapted to secure the cylindrically shaped hollow tube in place;
    wherein, during operation the second end extends into the gas inlet tube with the angled opening facing away from a direction of a gas flow in the gas inlet tube thereby resulting in a low pressure region that can be registered by a pressure sensor in communication with an electronic control unit that in turn can regulate the turbocharger.

2. The vent insert of claim 1, wherein the plurality of angled surface protrusions are located along the rim.

3. The vent insert of claim 1, wherein the rim thickness is configured to avoid interference with the connection of any other structures.

* * * * *